United States Patent [19]

Kashyap

[11] Patent Number: 5,013,115
[45] Date of Patent: May 7, 1991

[54] POLARIZATION INSENSITIVE OPTICAL FREQUENCY MIXER

[75] Inventor: Raman Kashyap, Ipswich, England

[73] Assignee: British Telecommunications public limited company, Great Britain

[21] Appl. No.: 411,529

[22] PCT Filed: Feb. 15, 1989

[86] PCT No.: PCT/GB89/00149

§ 371 Date: Oct. 2, 1989

§ 102(e) Date: Oct. 2, 1989

[87] PCT Pub. No.: WO89/07782

PCT Pub. Date: Aug. 24, 1989

[30] Foreign Application Priority Data

Feb. 15, 1988 [GB] United Kingdom ............... 8803450

[51] Int. Cl.$^5$ ............................................. G02F 1/37
[52] U.S. Cl. ................................. 350/96.14; 307/427;
307/430; 350/96.15; 350/96.29
[58] Field of Search ..................... 307/425-430;
350/96.13, 96.14, 96.15, 96.16, 96.29, 96.30

[56] References Cited

U.S. PATENT DOCUMENTS 4,684,215 8/1987 Shaw et al. ...................... 350/96.29

FOREIGN PATENT DOCUMENTS 2385114 10/1978 France .

OTHER PUBLICATIONS

Proceedings of SPIE—The International Society for Optical Engineering: Molecular and Polymeric Optoelectronic Materials: Fundamentals and Applications, 21st-22nd Aug. 1986, San Diego, Calif., vol. 682, pp. 170-178, SPIE, Bellingham, Wash. U.S., R. Kashyap.
IEEE Journal of Quantum Electronics, vol. QE-9, No. 9, Sep. 1973, pp. 919-933; A. Yariv: "Coupled-Mode Theory for Guided-Wave Optics".
Payne—"Second-Harmonic Generation In Single-Mode Optical Fibers," Elec. Letter, 5th Nov. 87, vol. 23, No. 23, pp. 1215-1216.
Österberg et al.—"Experimental Studies On Efficient Frequency Doubling In Glass Optical Fibers," Optics Letters, Jan. 87, vol. 12, No. 1, pp. 57-59.
Terhune et al.—"Second-Harmonic Generation In Fibers," J. Opt. Soc. Am. B, May 87, vol. 4, No. 5, pp. 661-674.
Levine et al.—"Phase-Matched Second Harmonic Generation In A Liquid-Filled Waveguide", Appl. Phys. Letters, Apr. 1975, vol. 26, No. 7, pp. 375-377.
Marcuse, "Optimal Electrode Design for Integrated Optics Modulators," IEEE J of QU. Elec., vol. QE-18, No. 3, Mar. 1982, pp. 393-398.

*Primary Examiner*—John D. Lee
*Attorney, Agent, or Firm*—Nixon & Vanderhye

[57] ABSTRACT

A polarization insensitive optical freqency mixer comprising an optical fiber coupler block (2), a silica fibre (6) with a region whose cladding (4) has been polished off close to the core (8) on which is rotatably mounted interdigitated electrodes (12) spaced from the coupler block (2) by a polymer film spacer (12). The electrodes (12) induce a spatially periodic electric field within the core (4) which reverses every half period which provides frequency doubling of light passing through the fibre (6) over the whole grating length. The electrodes are dimensioned to provide polarization insensitized frequency mixing by providing that the electric field components within the optical waveguide are substantially equal in two mutually orthogonal directions transverse the waveguide.

10 Claims, 2 Drawing Sheets

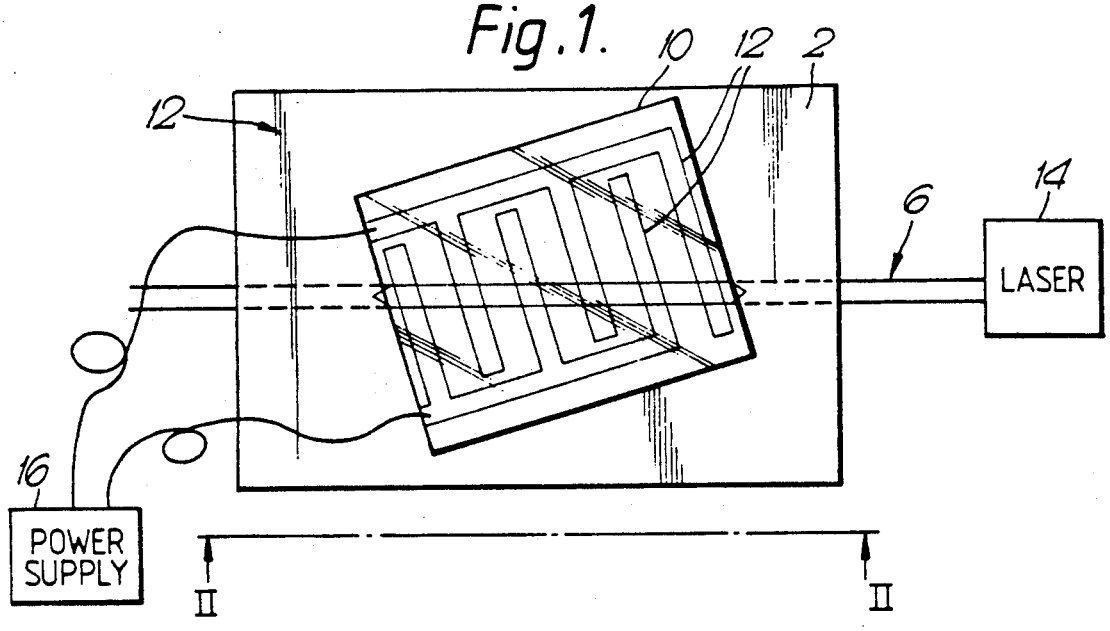
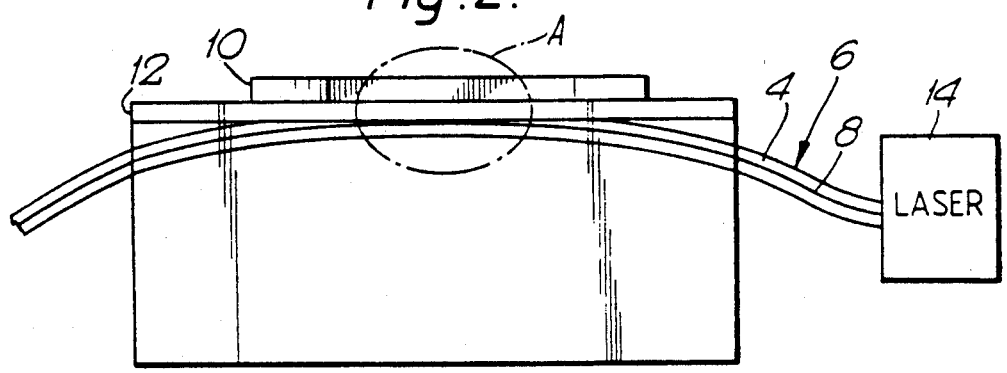
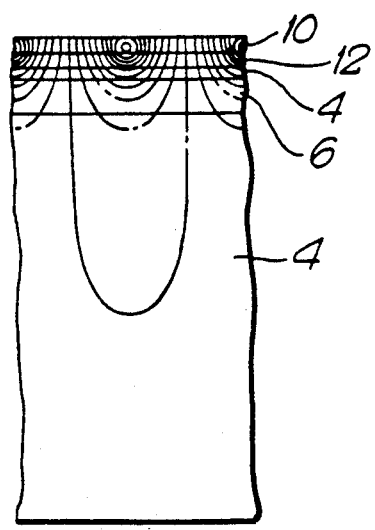

POLARIZATION INSENSITIVE OPTICAL FREQUENCY MIXER

This invention relates to methods of optical frequency mixing of particular but not exclusive application to optical frequency mixing in silica optical fibres for example to provide optical frequency doubling.

Frequency mixing has been recently observed in phosphorous doped single-mode fibres by several workers (Osterberg U and Margulis W. Opts Letts 11, pp 516–518, 1986, Farries M C et al, Electronics Letts, 23, pp 322–324, 1987, Stolen R and Tom H W K, 12,585, 1987). Since silica exhibits a centre of inversion and thus lacks an electric dipole allowed second order nonlinearity, $X^{(2)}$, it has been postulated that the non-linear interaction is due to the electric quadrupole and magnetic dipole moment (Payne D P, Electronics Letts, 23 (23), pp 1215–1216, 5th Nov. 1987). This process is self-phasematched, and as such there is little choice in the selection of particular interacting modes.

Phasematching has been discussed by Terhune R W and Weinberger D A, (JOSA-B, 4(5), May 1987) and dc-field-induced second-harmonic generation discussed by Weinberger D A and Terhune R W (CLEO, Session TUHH3, pp 78–79, Baltimore, Apr. 27 May 1, 1987,) where phasematching is achieved by proper design of the fibre. Efficient nonlinear devices may also be fabricated by incorporating high $X^{(3)}$ media as the core of a hollow fibre and using a periodic electrode grating structure opposite a continuous electrode for phase matching (Kashyap R, in Proc of SPIE Symposium on "Molecular and Polymeric Optoelectronic Materials: Fundamentals and Applications", San Diego, Calif., Volume 682, pp 170–178, 21–22 August 1986). The centre of asymmetry is induced by the electric field and phasematching is achieved by the spatial periodicity of the field.

The second-harmonic power from a fibre of length 1, with a third order nonlinearity of $X^{(3)}$ and for an applied spatially-periodic static electric field amplitude of $E_o$, is given by Kashyap R, in Proc of SPIE Symposium on "Molecular and Polymeric Optoelectronic Materials: Fundamentals and Applications", San Diego, Calif., Volume 682, pp 170–178, 21–22 August 1986 as $$P(2\omega) = \left[ \frac{3}{2} \epsilon_0 \pi \omega \chi^{(3)} P(\omega) E_0^1 \text{Sinc} (\Delta \beta 1/2) I \right]^2$$

where, $P(\omega)$ is the power in the fundamental mode, $\Delta\beta$ is the phase mismatch and I is the overlap integral between the static field, the transverse fundamental and second harmonic mode fields.

The effective second order nonlinearity is then given by $X^{(3)}E_o$. For phase matching the spatially periodic static field pitch equals $2l_c$, where $l_c$ is the effective coherence length as a result of the mismatch between the phase velocities of the fundamental and second harmonic guided modes. In general, the static field need not be uniform. Additionally, the selection rules for the mode interactions are governed by symmetry of the modes and sign of the fields. For non-uniform static fields, the forbidden interactions in the linearly polarised modes (LP) approximation are no longer valid and virtually all mode interactions thus have a finite overlap integral. The strength of the interaction will also depend on the square of the Fourier coefficient of the spatial harmonic of the field which will generally be less than 1.

A polarisation insensitive optical frequency mixer for generating a harmonic of a light signal comprises an optical waveguide and a pair of interdigitated electrodes located on one side of the waveguide for producing within the waveguide a spatially periodic electric field having a reversal every half period the period being selected to phasematch the interacting frequencies each with its own mode with the light signal and the electrode dimensions being selected to provide that the electric field within the optical waveguide and are substantially equal in two mutually orthogonal directions transverse the waveguide.

The invention finds particular application in the generation of second harmonic optical signals and without prejudice to the generality of modes of operation of the invention its use will be described in terms of optical frequency doubling. In use, the interdigitated electrode provides a spatially periodic field within the optical fibre to provide phasematching whilst providing an electric field reversal every half period which, as will be explained in more detail below, provides growth of the second-harmonic over the entire length of the device. The single electrode structure is considerably easier to manufacture than known methods of providing a spatially varying electric field within an optical fibre and growth of the second-harmonic over the entire length of the device provides a more efficient device than possible with known phasematched techniques which use electric-field induced frequency doubling using non-interdigitated electrodes opposite a common planar reference electrode.

The electrode may be mounted on a substrate so as to be rotatable in a plane parallel to the fibre axis to allow the spatial periodicity of the electrode relative to the fibre axis to be adjusted. Other arrangements of interdigitated electrodes may be used to allow adjustment of the spatial periodicity of the grating electrodes-for example a fan-shaped arrangement allowing adjustment by lateral movement.

The most efficient mode combination is experimentally observed, i.e. from the fundamental $LP_{01}$ mode to the second-harmonic $LP_{01}$. This is also generally the most difficult, since the phase mismatch is largest of all the mode interactions with the fundamental wavelength $LP_{01}$ mode. However, the benefit of the largest overlap integral makes this interaction highly attractive. Phase matching is possible over the entire length of the grating region by automatic static field reversal after each coherence length. Additionally, phase matching to all the propagating higher order second-harmonic $LP_{11}$, $LP_{21}$ and the $LP_{02}$ modes is also possible.

The term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibres.

An embodiment of the present invention and the principle of its operation will now be described, by way of example only, with reference to the accompanying drawings in which FIG. 1 is a diagrammatic plan view of an optical frequency doubler according to the present invention;

FIG. 2 is a diagrammatic side view of the optical frequency doubler of FIG. 1 in the direction II—II;

FIG. 3 is a schematic, expanded view of region A of FIG. 2 showing the equipotential lines when voltages are applied to the electrodes of FIG. 1;

Figure 4:
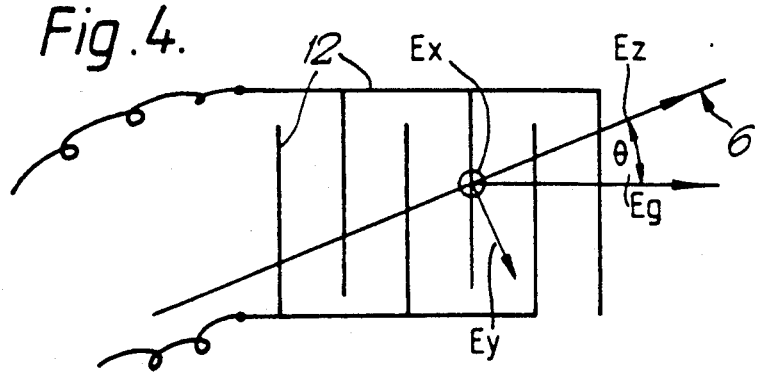
FIG. 4 is a diagrammatic plan view of the electrode of FIG. 1 showing the resolution of field components relative to the longitudinal axis of the fibre.

Referring to FIGS. 1 and 2, an optical frequency doubler comprises an optical fibre coupler block 2 in which the cladding 4 of the single-mode optical fibre 6 has been polished off close to the core 8. The radius of curvature of the fibre 6 in the polished region is 250 mm. A glass slide 10 having interdigitated grating electrodes 12 on its undersurface was spaced from the optical fibre 6 by a 2 $\mu$m thick Polymer film spacer 12. A drop of low index dielectric liquid (not shown) was sandwiched between the half coupler block 2 and grating electrodes 12. An alternative to this scheme is to deposit a dielectric medium such that the refractive index of the medium, $\eta$ dielectric is much less than the refractive index of the immediate cladding material of the waveguide (i.e. n dielectric<<n clad) so that the optical field in the waveguide does not notice the electrodes. Care has to be taken to ensure that the evanescent field does not encounter the metal grating electrode which can be, for example, tinOxide which may be less deleterious. The slide 10 is rotatable relative to the optical fibre 6 so that the grating angle relative to the fibre 6 can be changed.

The output from a Q-switched Nd:YAG laser 14 operating at 1.064 $\mu$m was launched into one end of the fibre 6 and the light output from the other end focused onto a photomultiplier tube after passing through a fundamental-wavelength-block and second harmonic pass-band filters (not shown) to demonstrate the operation of the present invention. The Q-switch driver of the laser 14 with a repetition rate of 1 kHz was synchronised to a high voltage sinusoidal source 16 so as to be at a maximum at the arrival time of the Q-switched pulse.

In this particular embodiment the voltage was variable up to 300 v peak to peak with the optical power varied to a maximum of 1.7 kw. The electrode pitch was 32 $\mu$m with an electrode width of 4.4 $\mu$m. This choice of pitch allowed phase matching of many different types of fibre for all propagating second harmonic modes by varying the angle of the grating 12 relative to the fibre 6.

Figure 5:
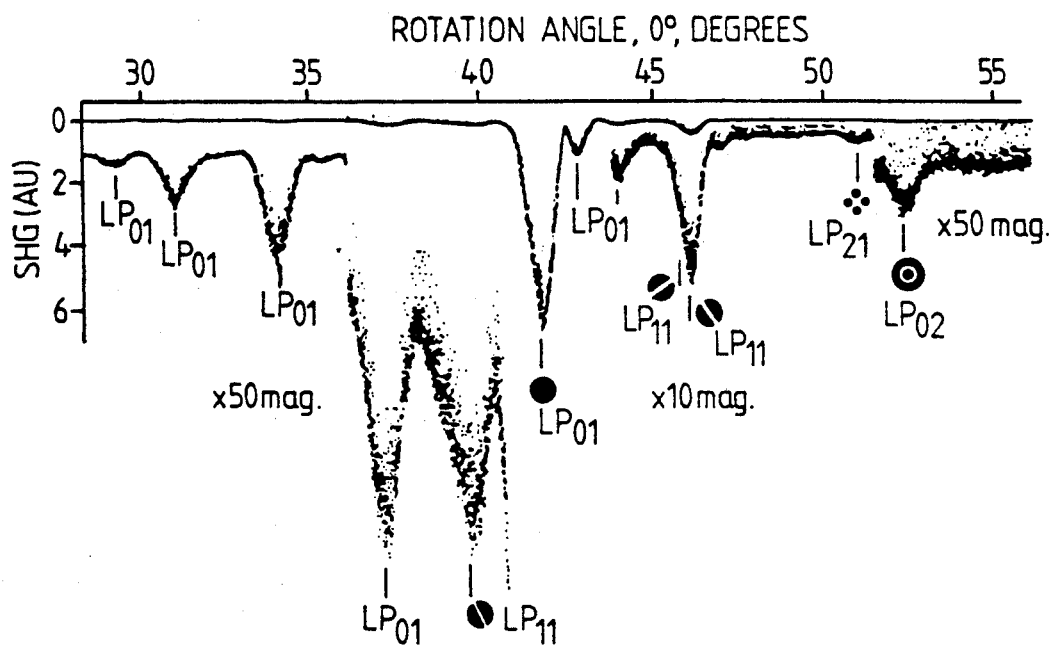
FIG. 5 is a graph showing the second-harmonic signals produced by the embodiment shown in FIG. 1 as a function of the angle of the grating to the fibre.

FIG. 5 shows the second-harmonic signal as a function of the grating rotation angle. The continuous curve shows the second-harmonic generated with phase-matching of $LP_{01}(\omega)$ to $LP_{01}(2\omega)$ at an angle of 41.35°. Comparison with other second-harmonic modes designated on FIG. 3 highlights the relative merit of this interaction. It was noted that the fibre 6 was birefringent since orthogonal modes of the second-harmonic phase-matched at slightly different angles. This is shown in the pictorial representation below the main $LP_{11}(2\omega)$ peak. The angular difference was measured to be about 0.35° which is equivalent to a beat length of 10.2 mm, which is rather small. $LP_{21}(2\omega)$ shows similar behaviour. The coherence length of $LP_{01}(\omega)$ to $LP_{01}(2\omega)$ was measured to be 21.3 $\mu$m±0.17 $\mu$m. The coherence lengths measured for the interactions to the $LP_{11}(2\omega)$, the $LP_{21}(2\omega)$ and to the $LP_{02}(2\omega)$ were 22.9, 25.2 $\mu$m and 25.7 $\mu$m.

A sinc$^2$ function was fitted to the main $LP_{01}$ peak. An effective interaction length of 3.6 mm was calculated from the width at half maximum. A maximum conversion efficiency of $4 \times 10^{-8}$% was measured for a peak input power of 1.67 KW with 175 V pk-pk applied. This suggests that the applied static field had a small Fourier coefficient for the fundamental spatial-frequency.

For a second device with a flat 4 mm fibre section and using the same grating, a conversion efficiency of $3.8 \times 10^{-4}$% was measured for 1.37 kW and 215 V pk-pk applied.

Measurements of phase-matched second-harmonic power as a function of both input power and applied static fields showed excellent square law dependence. Owing to the large angle of the grating (near 45°), two additional components contribute significantly to the generation of the second-harmonic (see FIG. 4). The harmonic will have an orthogonal polarisation and be $\pi/2$ out of phase with that generated by $X^{(3)}{xxxx}$ or $X^{(3)}{xyyx}$. Table 1 lists the active $X^{(3)}$ coefficients operating in the device and summarises the salient features.

TABLE I

| $X^{(3)}$ | Relative phase | Magnitude |
| --- | --- | --- |
| $X^{(3)}{xxxx}$ | 0 | 1 |
| $X^{(3)}{xyyx}$ | 0 | ⅓ |
| $X^{(3)}{xzzx}$ | 0 | ⅓ |
| $X^{(3)}{yyyy}$ | $\pi/2$ | ~1* |
| $X^{(3)}{yzzy}$ | $\pi/2$ | ~⅓* |
| $X^{(3)}{yxxy}$ | $\pi/2$ | ~⅓* |
| $X^{(3)}{zzzz}$ | $\pi/2$ | ~1* |
| $X^{(3)}{zxxz}$ | $\pi/2$ | ~⅓* |
| $X^{(3)}{zyyz}$ | $\pi/2$ | ~⅓* |

*electrode dependent

Referring now to FIGS. 3 there is shown the equipotentials generated by the grating electrodes in relation to the fibre core 6. The corresponding electric fields are shown in FIG. 4 relative to axes defined by the optical fibre 6 (with Ex perpendicular to the plane of the paper) for the grating at an angle $\theta$ to the fibre axis.

It can be seen by reference to FIG. 3 that the maximum horizontal field along the fibre axis $E_z$ is found between the electrodes and the maximum vertical electric field directly below the electrodes, that is the vertical and horizontal fields are $\pi/2$ out of phase. Ex is $\pi/2$ out of phase with both $E_z$ and $E_y$. The ratio of the field Eg to Ex is determined by the aspect ratios of the electrodes: for a given periodicity, narrower electrodes will produce low horizontal fields and slightly larger vertical fields, whereas wider electrodes can produce horizontal fields much higher than the vertical fields.

The value of abs (Ex)/abs(Eg) can be calculated using known finite element methods for given electrode width and spacings or using semi analytic techniques such as D. MARCUSE . . . IEE Journal of Quantum Electronics Vol QE-18, No. 3 March 1982.

If phasematching occurs for $\theta = 0$ then Ey would be zero so light polarised in the Ex direction (vertically polarised) would generate a second harmonic but none, or effectively none, would be generated in respect of horizontally polarised light. For an arbitrary electrode angle $\theta$ $$\frac{\text{Power}_x(2\omega)}{\text{Power}_y(2\omega)} = /E_{ox}/^2/(E_{og}^2 \sin^2\theta)$$

For a given configuration requiring a particular $\theta$ in order to ensure phasematching is achieved, preselection of the electrode dimensions can ensure that $$E_{og} = E_{ox}/\sin\theta$$

in which case $\text{Power}_x(2\omega) = \text{Power}_y(2\omega)$, i.e. the frequency doubler is x or y polarisation insensitive. For example, if $\theta = 45°$ the electrodes should be designed to provide $E_{og} = 2^{\frac{1}{2}} E_{ox}$. If $\theta = 19.5°$ then the electrodes should be chosen to provide $E_{og} = 3 E_{ox}$.

If $E_{ox} = E_{oy}$ it can be shown that launching light linearly polarised at 45° to the vertical will produce a circularly polarised second harmonic output.

The ability to provide polarisation desensitised frequency mixing is made possible by the use of the interdigitated electrodes of the present invention because this arrangement, in contrast to previous known electrode configurations used to provide phase matched frequency doubling, provides $E_{ox}$ and $E_{oy}$ electric fields, and further, fields which are controllable by way of electrode design and orientation relative to the fibre.

The above analysis ignores cross-terms which produce second harmonic generation out of phase with the $X^{(3)}xxxx$ and $X^{(3)}yyyy$ terms but at only about 10°/o that magnitude.

There is scope for device optimisation which would allow phase-matching over several cm. The conversion efficiencies expected for 10 cm device using glass with an order of magnitude larger nonlinearity is calculated to be about 50°/o for the same input power. This provides the possibility of efficient intra-cavity frequency doubling in fibre-lasers, providing alternative sources, and parametric amplification in fibres.

The invention has been described in detail in relation to the use of interdigitated electrodes in conjunction with a single mode optical fibre. However, the invention is applicable to any form of waveguide of any material in which second harmonic generation can be produced by means of an electro-optically induced non-linearity. For example, the waveguide may, be in the form of planar or channel devices. Nitrobenzene can be used as active core. Alternatively nitrobenzene can be used as an active cladding using a higher index glass for the core of the waveguide. Poled-polymer can also be used see e.g. where permanent poling with an alternating field could also achieve the same result (as in this patent) by phasematching.

It will be noted that the electrode arrangement of the present invention provides for the $E_{oz}$ component which alternates in sign which allows phase making for modes with a substantial $E_z$ (optical) Component. This interdigtated scheme also allows the utilisation of the largest nonlinear coefficient of several materials e.g. $d_{33y}$ ($=40\times10^{-12}m^2/V^2$) in $LiNbO_3$, or in MNA whose $d_{11}$ coefficient has a figure of merit i.e. $d^2/n^3$ of over 2000 over $LiNbO_3$ both of which are not normally phase matchable even in a waveguide. However, using electro-optic modulation of $d_{33}$ ($LiNbO_3$) or $d_{11}$ (MNA) efficient frequency mixing should be possible.

Figure 6:
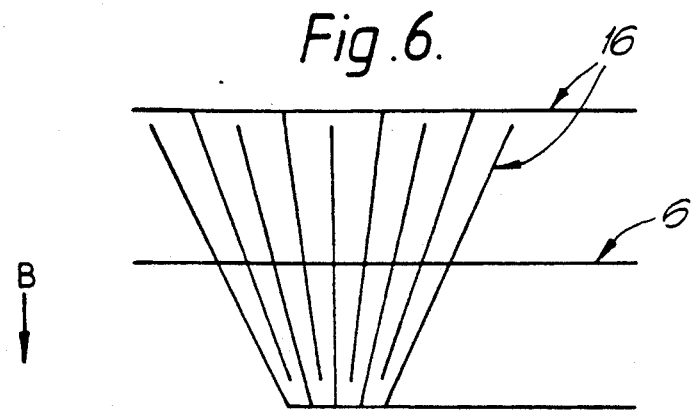
FIG. 6 is a diagrammatic plan view of an alternative electrode arrangement applicable to the present invention.

Referring now to FIG. 6 electrodes 16 are arranged in a generally fan-shaped arrangement in which the interelectrode gap increases, i.e. the electrodes diverge, as the electrodes 16 are moved in the direction $\theta$ relative to the fibre 6. In this arrangement phasematching is achieved through movement of the electrodes along the line B.

The invention is also applicable to waveguides of a material in which photoexitation provides charge carriers which can then be influenced by the external field to cause redistribution of the carriers and consequently allow the required internal space charge field to build up. In this case the space fileds continue to exist once the external field is removed.

I claim:

1. A polarisation insensitive optical frequency mixer for generating a harmonic of a light signal comprising: an optical waveguide; and
   a pair of interdigitated electrodes located on one side of the waveguide for producing within the waveguide a spatially periodic electric field having a reversal every half period;
   the period being selected to phasematch the interacting frequencies each with its own mode with the light signal and the electrode dimensions being selected to provide that the electric field within the optical waveguide is substantially equal in two mutually orthogonal directions transverse to the waveguide.

2. A polarization insensitive optical frequency mixer for generating a harmonic of a light signal comprising: an optical waveguide; and
   a pair of interdigitated electrodes located on one side of the waveguide for producing within the waveguide a spatially periodic electric field having a reversal every half period, said electrodes being rotatable relative to said optical waveguide;
   the period being selected to phasematch the interacting frequencies each with its own mode with the light signal and the electrode dimensions being selected to provide that the electric field within the optical waveguide is substantially equal in two mutually orthogonal directions transverse to the waveguide.

3. An optical frequency mixer as claimed in claim 1 in which said electrodes diverge along an axis and are moveable relative to the waveguide thereby to change the spatial periodicity of the electrodes relative to the waveguide.

4. An optical frequency mixer as claimed in claim 1 in which said optical waveguide comprises an optical fibre coupler block incorporating a silica fibre.

5. An optical frequency mixer as claimed in claim 1 in which said electrodes are formed on a glass slide and separated from the optical waveguide by a spacer of a medium of lower refractive index than the cladding of the waveguide.

6. A polarization insensitive optical frequency mixer for generating a harmonic of a light signal comprising: an optical waveguide, and
   interdigitated electrodes adjacent the waveguide generating a spatially periodic electric field within the waveguide that reverses at half periods, said field being substantially equal in two orthogonal directions transverse to said waveguide;
   the period of said field being selected to phasematch interacting frequencies of said light signal each corresponding to a mode of the waveguide.

7. An optical frequency mixer as in claim 6 in which said electrodes are rotatable relative to said waveguide.

8. An optical frequency mixer as in claim 6 in which said electrodes diverge and are moveable relative to said waveguide to adjust the spatial periodicity of said field.

9. A method for genrating a harmonic of a light signal using a polarization insensitive optical frequency mixer comprising a waveguide and interdigitated electrodes adjacent the waveguide, said method comprising the steps of:

a. launching an optical signal through the waveguide, b. applying a periodic electric current to the electrodes to generate a spatially periodic electric field in the waveguide that reverse at half periods, c. orienting the electrodes so that the electric field is substantially equal in two orthogonal directions transverse to the waveguide, and d. selecting the period of the spatially periodic electric field to phasematch interacting frequencies of the light signal that each correspond to a mode of the waveguide.

10. A method as claim 9 wherein said orienting step comprises rotating the electrodes relative to the waveguide.

* * * * *